(12) United States Patent  (10) Patent No.: US 7,726,934 B2
Cowan  (45) Date of Patent: Jun. 1, 2010

(54) VERTICAL AXIS WIND TURBINE

(75) Inventor: Orval Gideon Cowan, Oklahoma City, OK (US)

(73) Assignee: Preferred Energy, L.L.C., Edmond, OK (US)

( * ) Notice: Subject to any disclaimer, the term of this patent is extended or adjusted under 35 U.S.C. 154(b) by 592 days.

(21) Appl. No.: 11/671,867

(22) Filed: Feb. 6, 2007

(65) Prior Publication Data
US 2008/0187432 A1 Aug. 7, 2008

(51) Int. Cl.
F03D 7/06 (2006.01)
F03D 3/00 (2006.01)
(52) U.S. Cl. .................. 415/4.2; 415/4.4; 415/907
(58) Field of Classification Search .................. 415/4.2, 415/4.4, 907
See application file for complete search history.

(56) References Cited

U.S. PATENT DOCUMENTS

| 194,822 | A | | 9/1877 | Howard |
| 818,013 | A | | 4/1906 | Bartlett |
| 1,341,045 | A | | 5/1920 | Currey |
| 1,764,052 | A | | 6/1930 | Pfeifer |
| 2,812,823 | A | | 11/1957 | Oviedo |
| 4,031,405 | A | | 6/1977 | Asperger |
| 4,105,363 | A | * | 8/1978 | Loth ........................ 416/41 |
| 4,245,958 | A | | 1/1981 | Ewers |
| 4,260,325 | A | | 4/1981 | Cymara |
| 4,359,311 | A | | 11/1982 | Benesh |
| 4,718,821 | A | * | 1/1988 | Clancy ...................... 416/44 |
| 4,915,580 | A | | 4/1990 | Obidniak |
| 5,391,926 | A | | 2/1995 | Staley et al. |
| 5,503,530 | A | | 4/1996 | Walters |
| 5,531,567 | A | * | 7/1996 | Hulls ........................ 416/87 |
| 5,664,418 | A | | 9/1997 | Walters |
| 6,191,496 | B1 | | 2/2001 | Elder |
| 6,345,957 | B1 | | 2/2002 | Szpur |
| 6,448,668 | B1 | | 9/2002 | Robitaille |
| 6,582,291 | B2 | | 6/2003 | Clark |
| 6,841,894 | B2 | | 1/2005 | Gomez Gomar |
| 6,857,846 | B2 | | 2/2005 | Miller |
| 6,984,899 | B1 | | 1/2006 | Rice |
| 7,008,171 | B1 | | 3/2006 | Whitworth |

(Continued)

FOREIGN PATENT DOCUMENTS

DE 102004041281 * 3/2006

(Continued)

Primary Examiner—Edward Look
Assistant Examiner—Jesse Prager
(74) Attorney, Agent, or Firm—Head, Johnson & Kachigian, P.C.

(57) ABSTRACT

A vertical axis wind turbine having a plurality of blades spaced from a rotatable around a rotor shaft vertical to the ground. The plurality of blades are arranged in a helical pattern about the rotor shaft. Each blade is flexible to move in response to wind and has a top, bottom, leading edge, and trailing edge wherein the leading edge is in the shape of an airfoil. A hub having a plurality of blade attachment rods radially extending from the rotor wherein in one blade is secured to one of the attachment arms. The hub has a plurality of attachment rods radially extending from the rotor wherein one blade is secured to one of the attachment rods near the center and wherein the top of each blade is closer to the rotor than the bottom of each blade.

7 Claims, 9 Drawing Sheets

U.S. PATENT DOCUMENTS

| | | |
|---|---|---|
| 7,040,859 B2 | 5/2006 | Kane |
| 2003/0030283 A1* | 2/2003 | Lusk .......................... 290/44 |
| 2004/0061337 A1* | 4/2004 | Becker ....................... 290/44 |
| 2005/0084373 A1* | 4/2005 | Suzuki ................... 416/132 B |
| 2005/0169742 A1* | 8/2005 | Kane ......................... 415/4.4 |
| 2007/0258806 A1* | 11/2007 | Hart ........................... 415/71 |

FOREIGN PATENT DOCUMENTS

| | | |
|---|---|---|
| FR | 2768187 | 3/1999 |
| GB | 1518151 A * | 7/1978 |
| GB | 2404227 | 1/2005 |

* cited by examiner

VERTICAL AXIS WIND TURBINE

BACKGROUND OF THE INVENTION

1. Field of the Invention

The preset invention is directed to a vertical axis wind turbine having a plurality of blades arranged around a rotor shaft vertical to the ground. In particular, the present invention is directed to a vertical axis wind turbine incorporating a number of design improvements to provide a more effective and efficient wind turbine for generating electrical energy.

2. Prior Art

The use of wind turbines as a source of electrical energy has been utilized in various configurations in the past and is continued interest, given the increase in cost of fossil fuel as a source of power for electrical generators.

Two of the popular types of wind turbines are vertical axis wind turbines and horizontal axis wind turbines. The axis of the turbine is parallel to the ground and the rotor of a horizontal axis wind turbine generally faces into or away from the direction of the wind.

Various types of vertical axis wind turbines have also been proposed over the years. The Savonius wind turbine (such as seen in U.S. Pat. No. 1,697,574) including a pair of half cylinders mounted on a vertical shaft. The Savonius turbines are drag-type devices consisting of two or their half cylinders or scoops. Because of the curvature, the scoops experience less drag when moving against the wind than when moving with the wind.

Another type of vertical axis wind turbine is the Darrieus wind turbine (such as seen in U.S. Pat. No. 1,835,018) which consists of a number of airfoils mounted on a vertical rotating shaft or framework. The airfoils are arranged so that they are symmetrical and move forward through the air in a circular path. Relative to the blades, the oncoming airflow is added vertically to the wind, so a that the result in airflow creates a varying small positive angle of attack to the blade.

Other proposals for wind turbines include the following:

Kane (U.S. Pat. No. 7,040,859) discloses vanes 80 of a wind turbine 26 having a longitudinal axis 152 between 30° and 60° of the polar axis of the spheroid. The leading 100 and trailing 102 edges are elongated "S" curves. Each blade has a cross section of one half of an ellipse which is a poor airfoil. Each blade also has both leading and trailing edges rounded. Kane operates primarily as a drag or Savonius type device and its blade speed will be limited to the wind speed.

Obidniak (U.S. Pat. No. 4,915,580) discloses a wind turbine with blades comprising a body having a pair of opposed major planar surfaces and a cone or conoid shaped configured with a pair of opposed ends.

Robitaille (U.S. Pat. No. 6,448,668) discloses a turbine with curved blades which appear to be angled with respect to the axis.

Bartlett (U.S. Pat. No. 818,013) discloses a windmill with a plurality of longitudinally extending curved blades although each blade is parallel to the vertical axis.

Howard (U.S. Pat. No. 194,822) discloses a windmill with curved radial vanes B and B', although each is parallel to the axis.

Ewers (U.S. Pat. No. 4,245,958) discloses a plurality of radially curved vanes.

Pfeifer (U.S. Pat. No. 1,764,052) discloses through shaped vanes 12 with upper and lower end closures.

Asperger (U.S. Pat. No. 4,031,405) discloses a windmill with radially extending curved vanes.

De Oviedo (U.S. Pat. No. 2,812,823) discloses a streamlined shape for vanes of a windmill.

Cymara (U.S. Pat. No. 4,260,325) disclosed a vertical axis windmill having vanes with U-shaped fins 32.

Benesh (U.S. Pat. No. 4,359,311) discloses blades 40, 41 and 42 having a curved portion 45 and an opposed inner edge 44.

Staley et al. (U.S. Pat. No. 5,391,926) discloses a vertical axis turbine with curved rotors extending from a shaft and double curved stators to direct wind to rotors.

Walters (U.S. Pat. No. 5,503,530 and 5,664,418) discloses a vertical axis turbine with impellers 4 having a triangular cross-section.

Becker (U.S. Patent Application Publication No. 2004/0061337) discloses a wind turbine with non-segmented smooth walled helically twisted inner turbine blades and a pair of opposed outer airfoil blades.

Nevertheless, there remains a need for an efficient wind turbine to be used to transform wind energy into electrical energy.

SUMMARY OF THE INVENTION

The present invention is directed to a vertical axis wind turbine including a plurality of equally spaced blades. Each of the blades is rotable around a rotor shaft which is substantially vertical to the ground.

Each blade has a top, an opposed bottom, a leading edge and an opposed trailing edge. The blades are each spaced from the rotor shaft and are arranged in a pattern wherein the top of each blade is oriented at a different radial position from the bottom of the blade.

Each blade is supported at the top and at the bottom by an arm or other structure. Each arm is tapered, larger at the base or hub and smaller at the blade, and may be either round, hexagon, square or triangular in shape. Each blade itself may be fabricated or composed of a flexible material.

Each blade is secured to an arm which is pivotally connected to one of the blade attachment rods at the center of the blade.

The top of each blade is closer to the rotor shaft than the bottom of the blade. Accordingly, the blades are arranged at an angle to the axis of the rotor shaft so that the blades are farther away at the bottom than at the top.

The leading edge of each blade has a cross-section that is in the shape of an airfoil. Finally, each blade is slightly twisted as it progresses from the top to the bottom.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
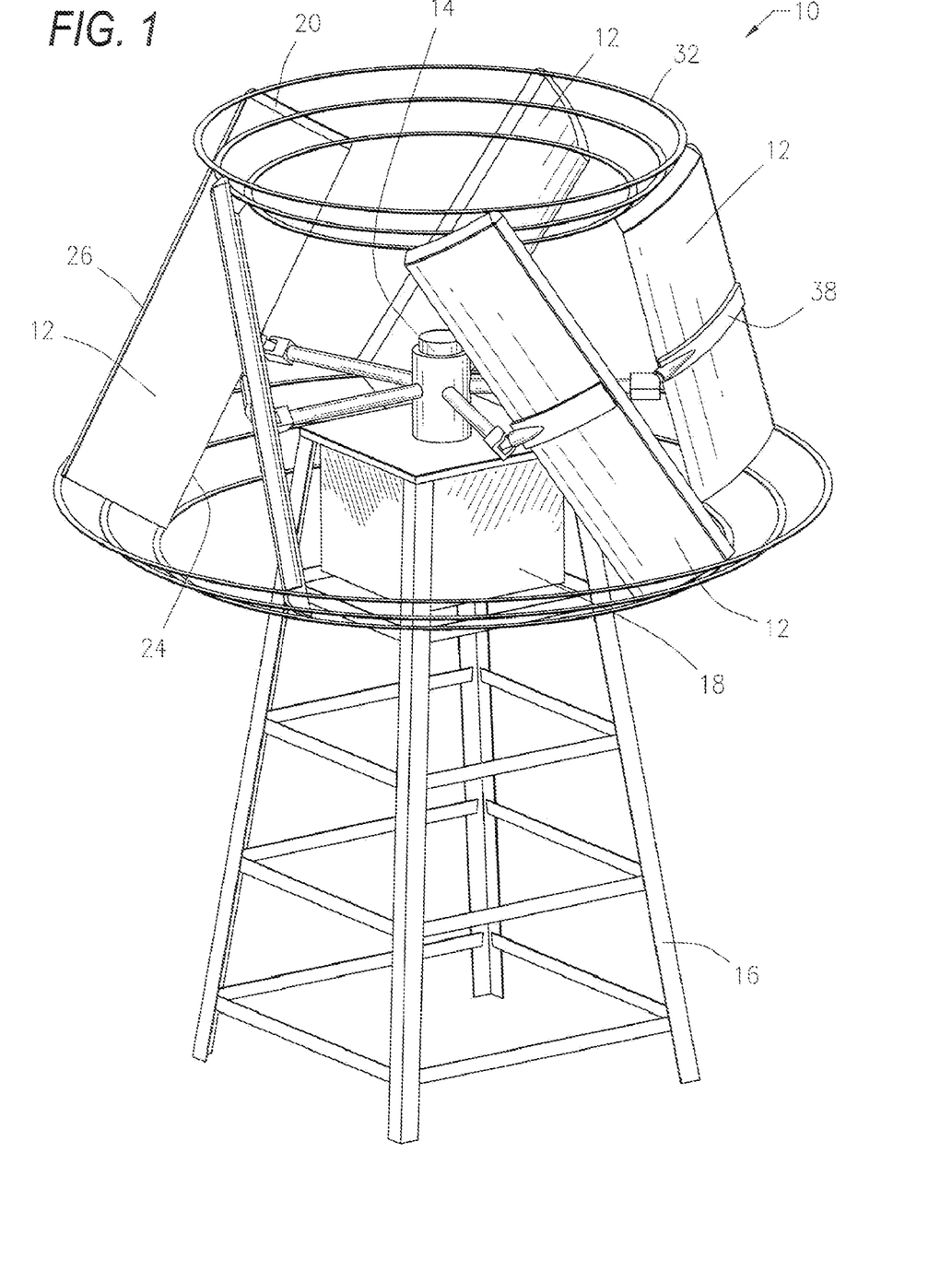
FIG. 1 is a perspective view of a preferred embodiment of a vertical axis wind turbine constructed in accordance with the present invention.

Referring to the drawings in detail. FIG. 1 illustrates a perspective view of a preferred embodiment of a vertical axis wind turbine 10 constructed in accordance with the present invention. The turbine 10 includes a plurality of blades 12 equally spaced from each other. Each of the blades 12 is rotatable around a rotor shaft 14 which is substantially vertical to the ground (not shown).

In the present embodiment, five blades 12 are arranged around the rotor shaft 14 which forms an axis. It will be appreciated that a greater or lesser number of blades 12 may be utilized within the spirit and scope of the present invention.

Figure 2:
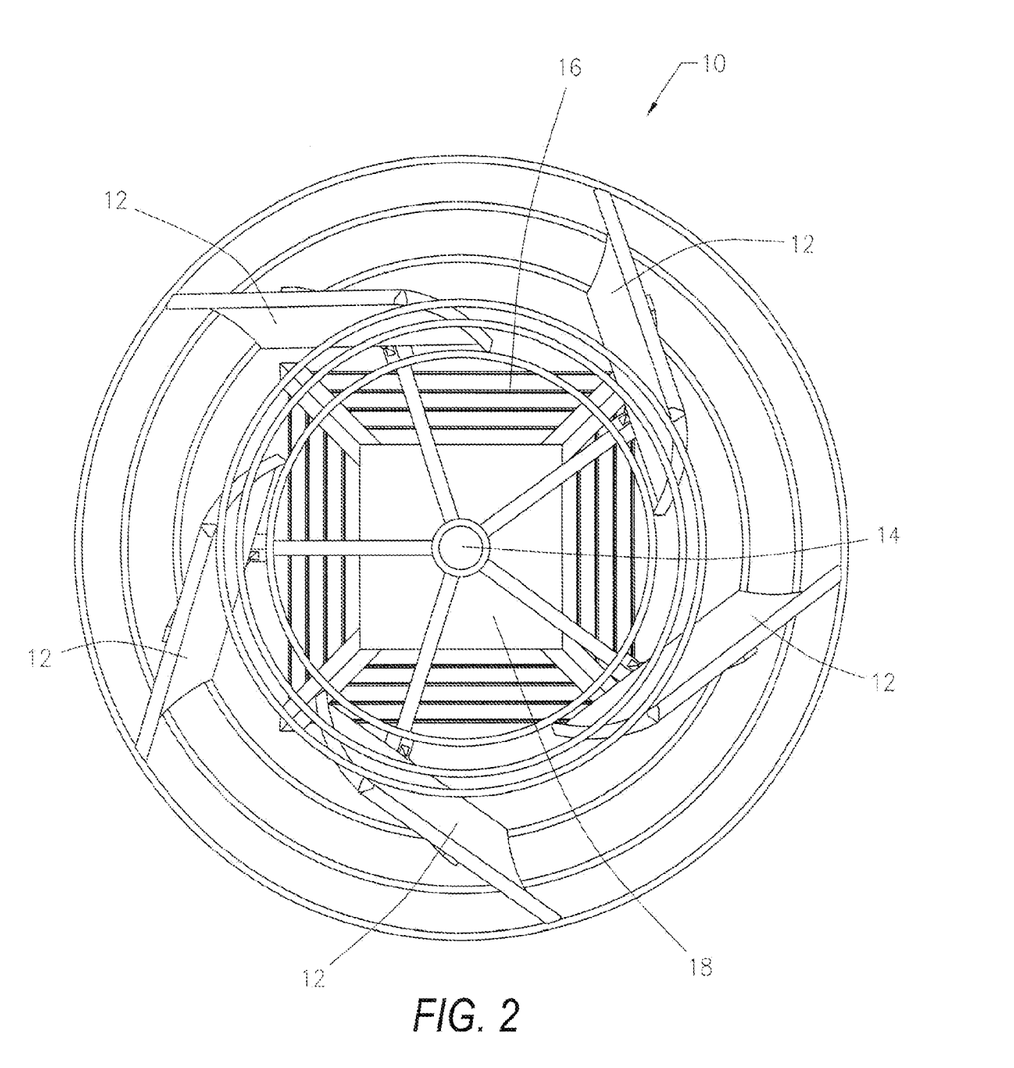
FIG. 2 illustrates a top view and FIG. 3 illustrates a side view of the vertical axis wind turbine illustrated in FIG. 1.
Figure 3:
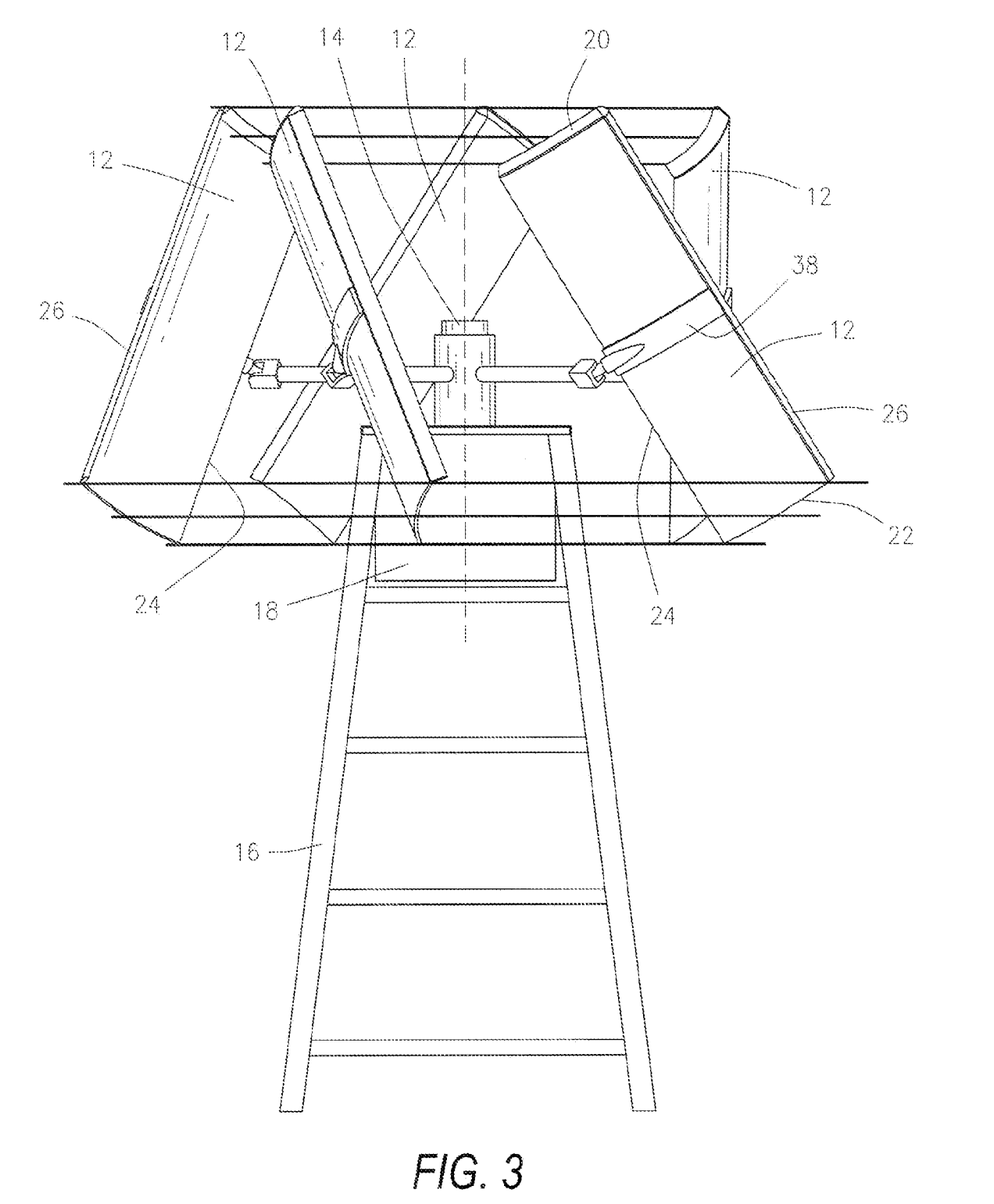

FIG. 2 shows a top view of the wind turbine 10 shown in FIG. 1 while FIG. 3 shows a side or plan view.

The vertical axis wind turbine 10 includes a supporting structure or derrick 16 that may be constructed in various configurations. The supporting structure 16 supports an electrical generator 18 which is in communication with the shaft 14 so that rotation of the shaft 14 powers the electrical generator 18.

Figure 4:
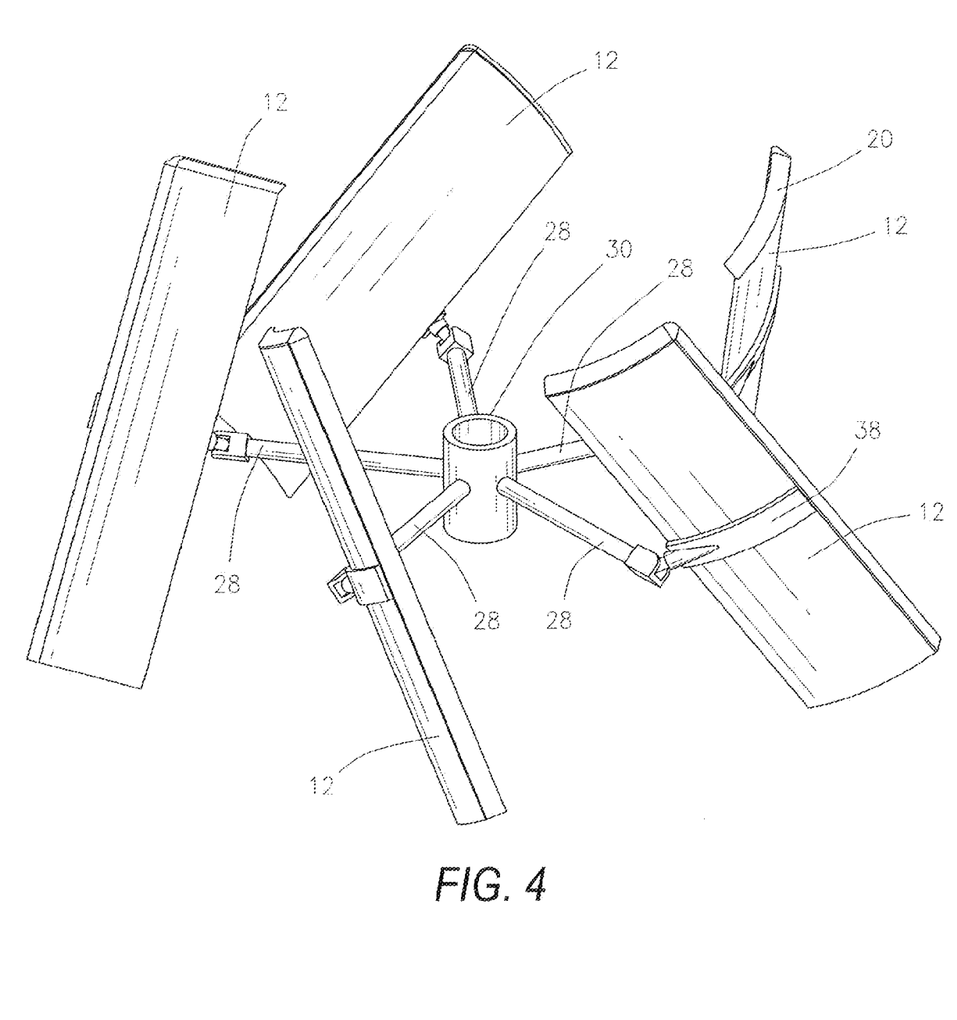
FIG. 4 illustrates a perspective view of the blades and central hub apart from the wind turbine illustrated in FIGS. 1, 2 and 3.

FIG. 4 illustrates a perspective view of the blades 12 which are arranged around a hub 30 which surrounds and is attached to the shaft 14 (not shown) with the balance of the wind turbine removed from clarity. Extending from the hub 30 are a plurality of arms 28 which extend radially from the shaft 14.

Figure 5:
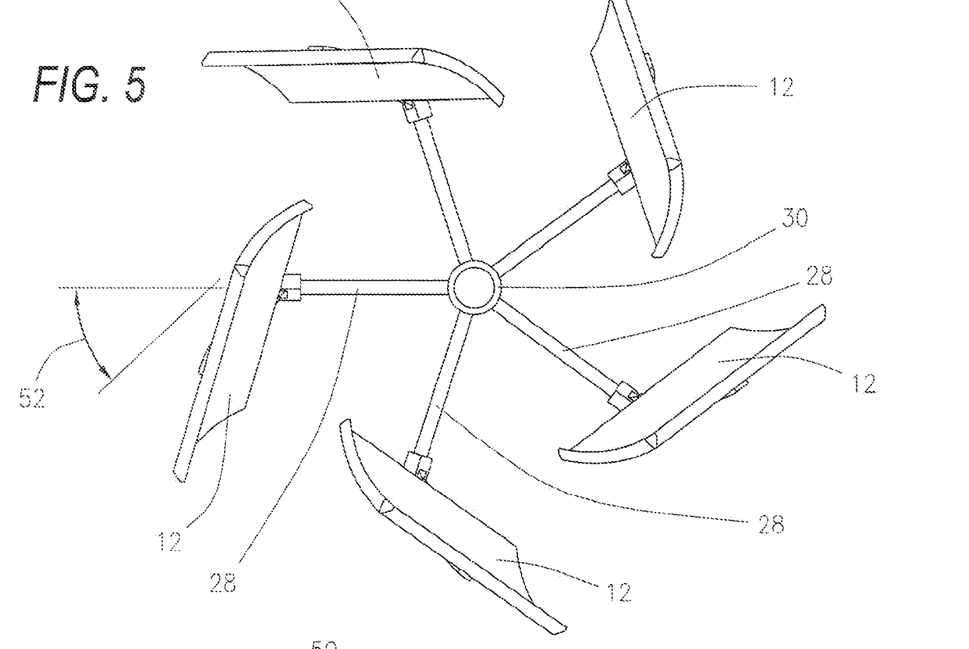
FIGS. 5 and 6 illustrate alternate views of the blades and hub to illustrate the positioning and angles of the blade.
Figure 6:
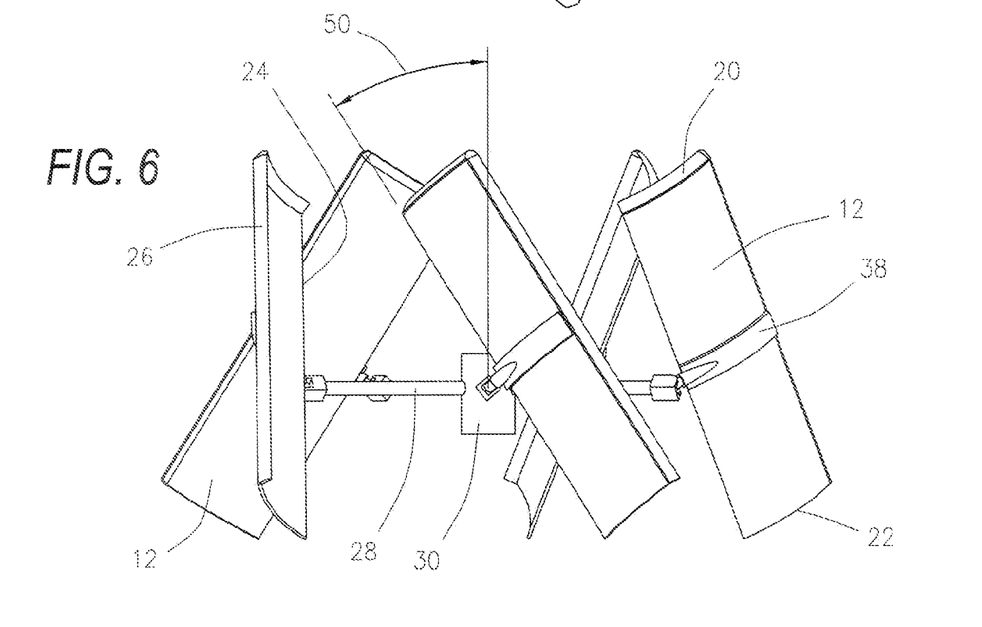

FIGS. 5 and 6 illustrate alternate views of the blades 12 showing the positioning of each blade.

Each blade 12 has a top 20, an opposed bottom 22 parallel to the top, a leading edge 24, and an opposed trailing edge 26 parallel to the leading edge. The blades 12 are each spaced from the rotor shaft 12 and are arranged in a pattern wherein the top 20 of each blade is oriented at a different radial position from the bottom 22 of the blade so that the blades are oriented in an angled pattern round the rotor shaft 14 which forms an axis. From the orientation of the leading edge, the bottom 22 is radially offset counterclockwise from the top 20 of the blade at a camber angle illustrated by arrow 50. The chamber angle is approximately 32° and may range from 25° to 40°.

Returning to a consideration of FIGS. 1, 2 and 3, each blade 12 is supported by circular stabilizing rings 32 at the top 20 and at the bottom 22 by circular stabilizing rings 36. In the present embodiment, three top stabilizing rings 32 and three bottom stabilizing ring are utilized. Each blade 12 itself may be fabricated or composed of alloys or plastics or other flexible material so that the blade is flexible and will move in response to force from the wind. The leading edge of each blade 12 forms an airfoil to provide a "lift" force with the blades capable of spinning faster than wind speed.

The hub 30 is attached to and extends radially from the rotor shaft 14. Each blade 12 is secured to an arm 28 by a bracket 38 which is connected near or at the center of the blade.

As best seen in FIG. 5, each blade is arranged at an angle to the radial arm 28 illustrated by arrow 52. In a preferred embodiment, the angle is approximately 50°.

Figure 7:
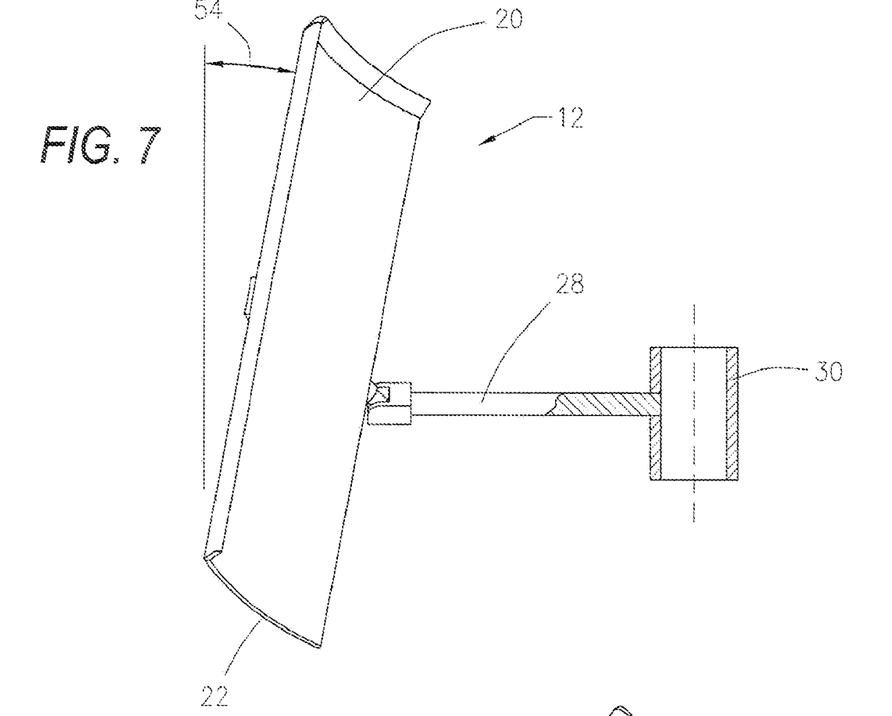
FIGS. 7, 8 and 9 show alternate views of a single blade of the wind turbine shown in FIGS. 1, 2 and 3.
Figure 8:
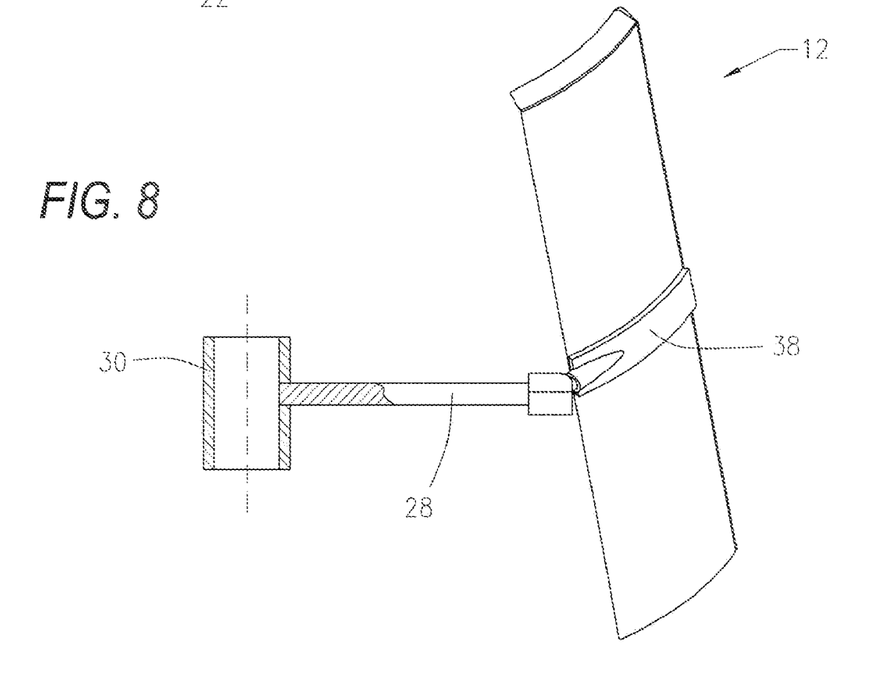

As best seen in FIG. 7, the top 20 of each blade 12 is closer to the rotor shaft 14 than the bottom 22 of the blade 12. Accordingly, the blades 20 are arranged at an angle to the axis of the rotor shaft 14 illustrated by arrow 54 so that the blades are farther away at the bottom than at the top. The angle could range from about 10° to about 15° with the overall geometry being a truncated cone. It will be appreciated that a greater or lesser number of degrees might be utilized within the spirit and scope of the present invention.

Figure 9:
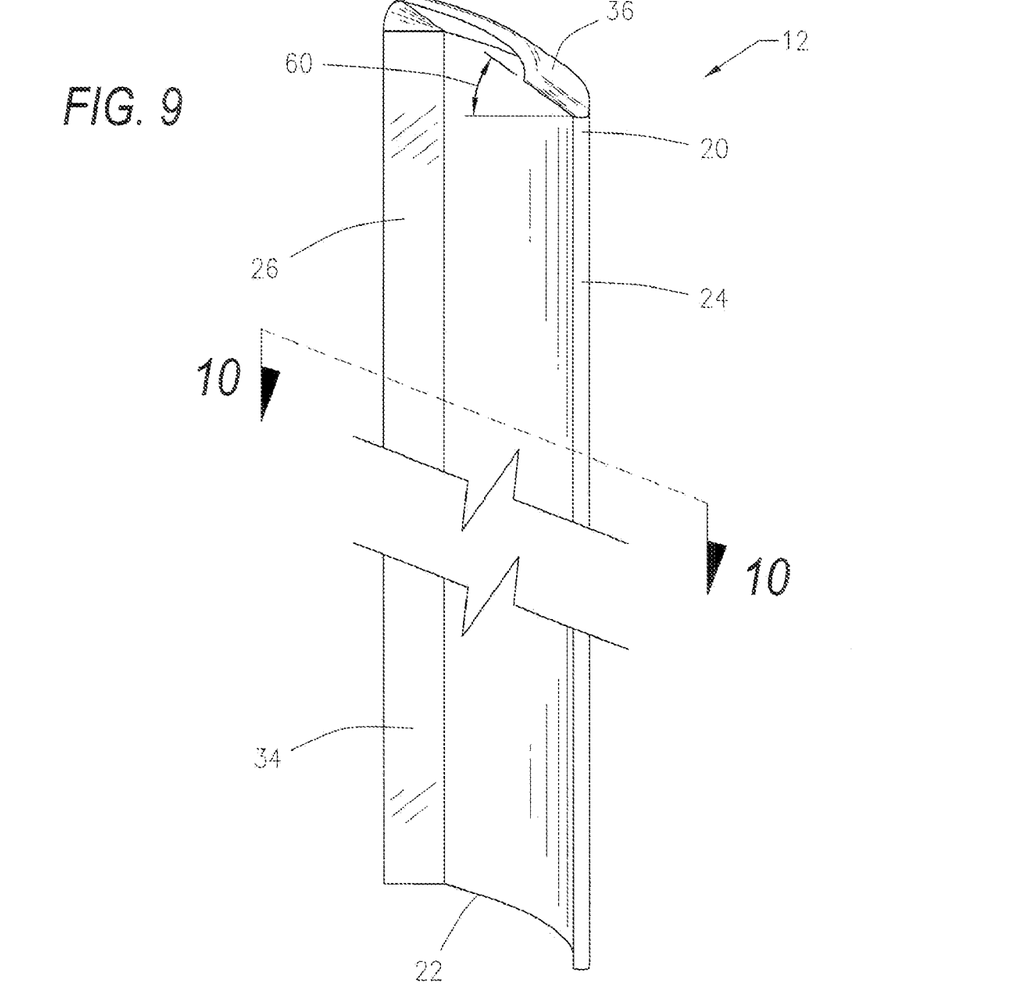
Figure 10:
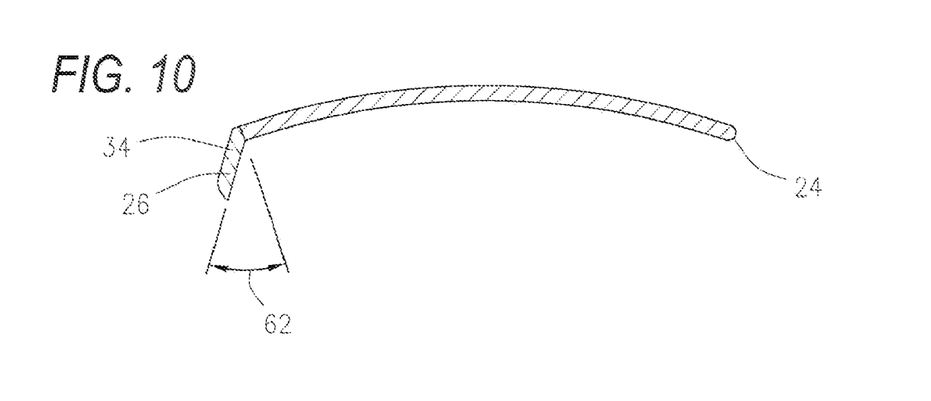
FIG. 10 illustrates a sectional view of one of the blades shown in FIGS. 7, 8 and 9.

FIG. 9 illustrates a perspective view of a single blade 12 apart from the vertical axis wind assembly, while FIG. 10 illustrates a sectional view taken along section line 10-10 of FIG. 9. Each blade 12 includes a side edge lip 34 extending along the trailing edge of the blade. The side edge lip 34 acts as an airfoil for the blade.

Likewise, the top 20 of each blade includes a top edge lip 36.

FIG. 10 illustrates a cross-section of a blade 12. The blade 12 acts like a wing. The cord line 42 is defined as a straight line from the leading edge to the trailing edge 26. The airfoil of the blade 12 of the present invention generates lift both by the Bernoulli principle and by the positive angle of attack. The Bernoulli principle produces lift since the airfoil shape causes the pressure on the upper surface to be less than the lower surface. A positive angle of attack causes the wind to push on the bottom surface, thus producing a lift force.

FIG. 5 illustrates blades 12 with an angle which may be varied in response to wind force and may be positively controlled. By changing the angle, the angle of attack will be changed.

Figure 11:
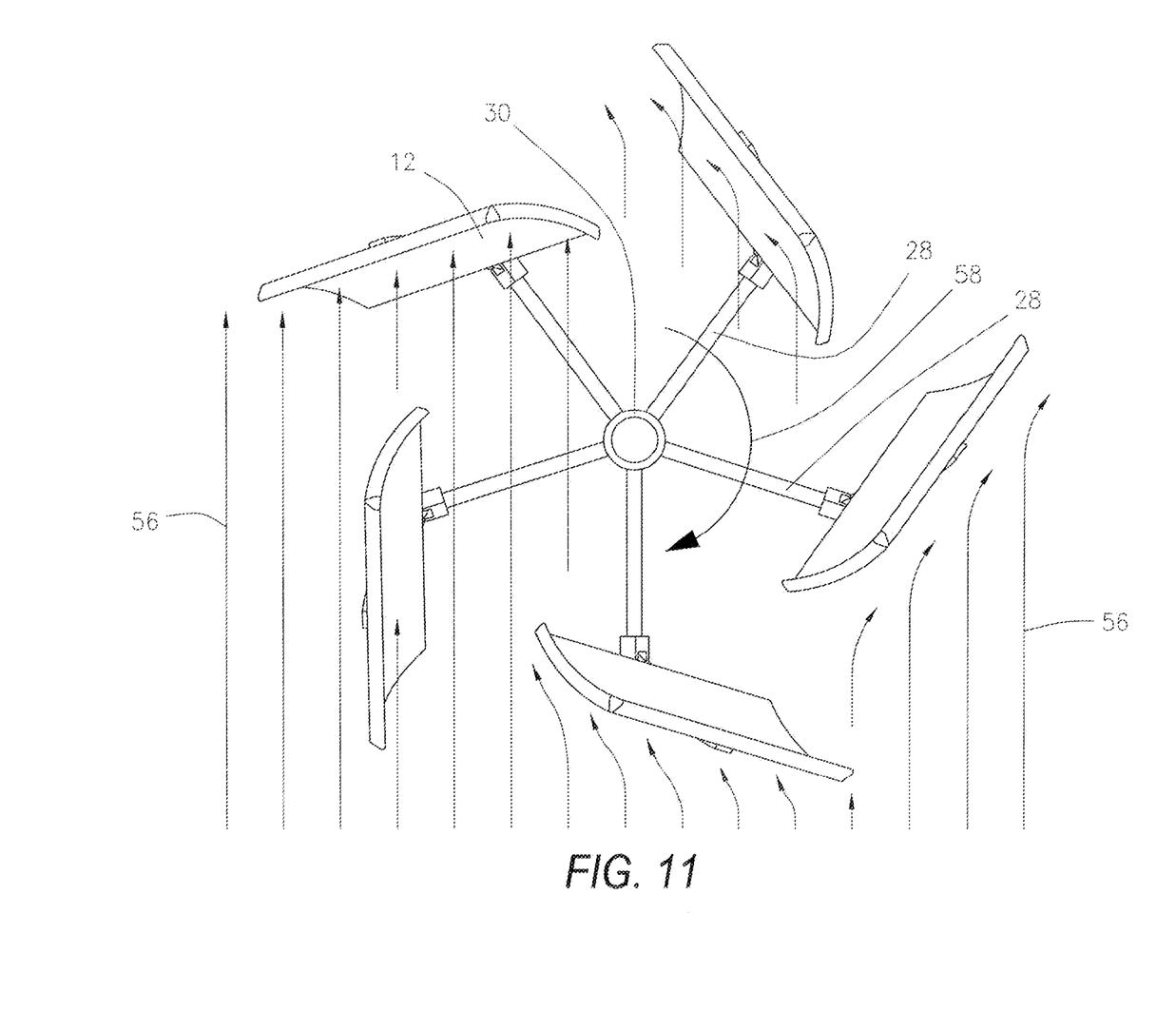
FIG. 11 illustrates a top view of the blades and central hub illustrating the force of wind on the blades.
Figure 12:
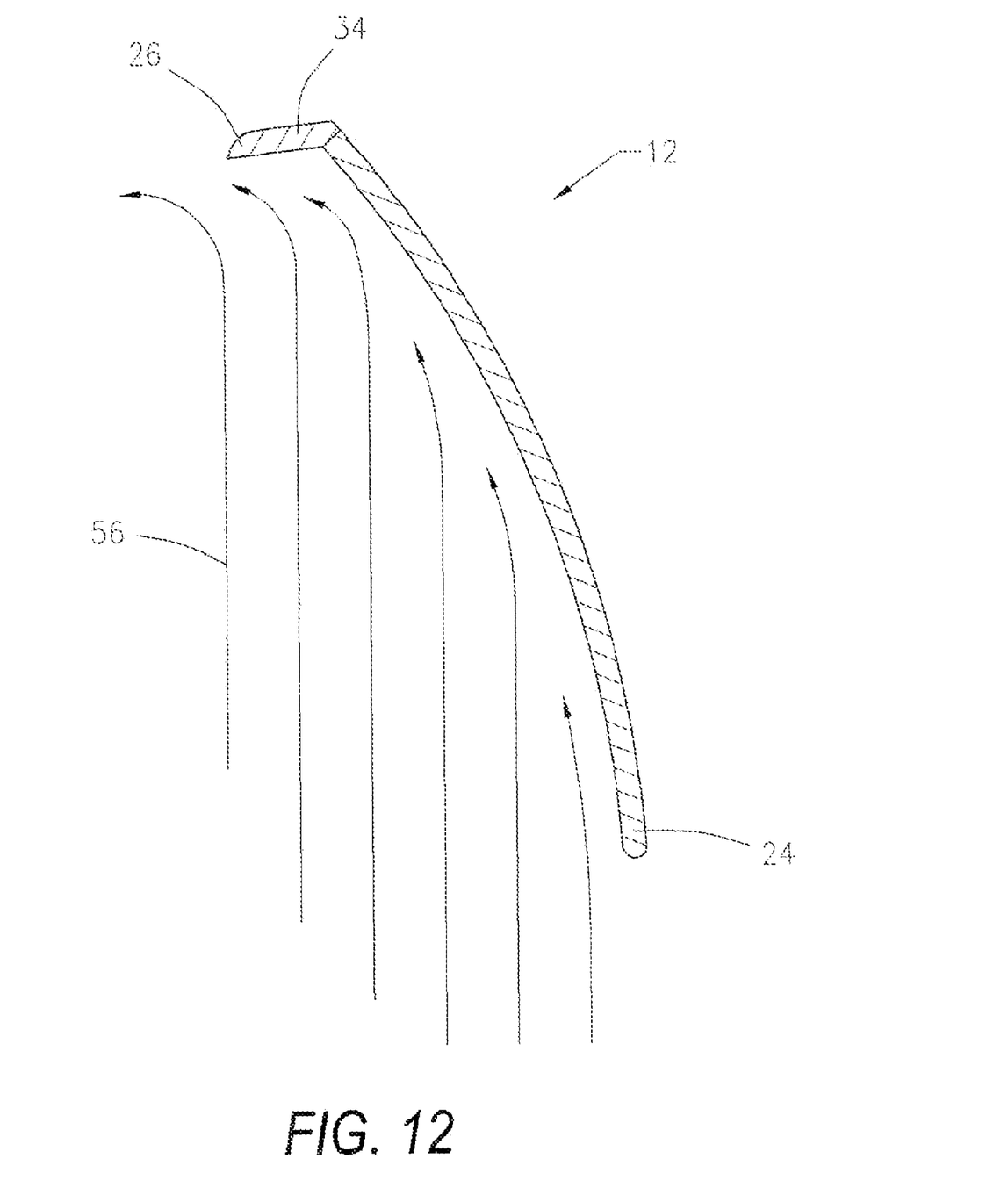
FIG. 12 illustrates a sectional view of one of the blades illustrating the force of wind thereon.

Finally, FIGS. 11 and 12 illustrate the force of wind by arrows 56.

The force of wind causes the blades 12 to fill with air and to move. Accordingly, the hub 30 will be caused to rotate in the direction of arrow 58. The rotor shaft 14 is thereby caused to turn by revolution of the hub.

Whereas, the present invention has been described in relation to the drawings attached hereto, it should be understood that other and further modifications, apart from those shown or suggested herein, may be made within the spirit and scope of this invention.

What is claimed is:

1. A vertical axis wind turbine comprising:

a plurality of blades spaced from and rotatable around a rotor shaft vertical to ground;

said plurality of blades arranged in a helical pattern about said rotor shaft;

each said blade having a top, a bottom opposed to said top, a leading edge, a trailing edge, a front surface, and a back surface, wherein said leading edge is in the shape of an airfoil;

a hub having a plurality of blade attachment arms radially extending from said rotor so that each said blade is secured to one of said attachment arms;

wherein each blade is angled such that said top of each blade is closer to said rotor shaft than said bottom of said blade; and wherein each said blade is attached approximately halfway between the top of the blade and the bottom of the blade to a tapered arm which is pivotally attached to said blade attachment arm.

2. A vertical axis wind turbine as set forth in claim 1 wherein each blade is at an angle to said rotor shaft of from 45° to 55°.

3. A vertical axis wind turbine as set forth in claim 1 having five said blades.

4. A vertical axis wind turbine as set forth in claim 1 wherein said rotor shaft is engaged with an electric generator.

5. A vertical axis wind turbine as set forth in claim 1 wherein each said top of each blade is attached to at least one circular stabilizing ring.

6. A vertical axis wind turbine as set forth in claim 1 wherein each said blade is angled such that said top is angled such that said top of each blade is closer to said rotor than said bottom of said blade at an angle from about 10° to 15°.

7. A vertical axis wind turbine as set forth in claim 1 wherein each said top of each said blade includes a top edge lip.

* * * * *